US009866957B2

(12) United States Patent
Katagiri

(10) Patent No.: US 9,866,957 B2
(45) Date of Patent: Jan. 9, 2018

(54) SOUND COLLECTION APPARATUS AND METHOD

(71) Applicant: Oki Electric Industry Co., Ltd., Tokyo (JP)

(72) Inventor: Kazuhiro Katagiri, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 15/158,569

(22) Filed: May 18, 2016

(65) Prior Publication Data

US 2017/0013357 A1 Jan. 12, 2017

(30) Foreign Application Priority Data

Jul. 7, 2015 (JP) ................................ 2015-136455

(51) Int. Cl.

*H04B 3/20* (2006.01)
*H04R 3/00* (2006.01)
*H04R 3/04* (2006.01)
*H04R 1/32* (2006.01)
*G10L 21/0208* (2013.01)
*G10L 21/0216* (2013.01)

(52) U.S. Cl.

CPC .......... *H04R 3/005* (2013.01); *G10L 21/0208* (2013.01); *H04R 1/326* (2013.01); *H04R 3/04* (2013.01); *G10L 2021/02166* (2013.01); *H04R 2430/20* (2013.01)

(58) Field of Classification Search

CPC ......... G10L 25/06; G10L 25/21; H04R 1/326; H04R 2430/20; H04R 3/005; H04R 3/04

USPC ............ 381/66, 71.1, 71.11, 91, 92, 95, 122

See application file for complete search history.

(56) References Cited

U.S. PATENT DOCUMENTS

2009/0279715 A1* 11/2009 Jeong .................... H04R 3/005 381/92
2012/0076316 A1* 3/2012 Zhu ....................... H04R 3/005 381/71.11
2013/0287225 A1* 10/2013 Niwa ................. G10L 21/0232 381/92

(Continued)

FOREIGN PATENT DOCUMENTS

JP 2014-072708 A 4/2014

OTHER PUBLICATIONS

"Sound technology series 16: Array signal processing for acoustics: localization, tracking and separation 20 of sound sources", The Acoustical Society of Japan Edition, Corona publishing Co. Ltd, Feb. 25, 2011.

*Primary Examiner* — Xu Mei
*Assistant Examiner* — Friedrich W Fahnert
(74) *Attorney, Agent, or Firm* — Rabin & Berdo, P.C.

(57) ABSTRACT

There is provided a sound collection apparatus, including a directionality formation unit configured to form a directionality in a direction of a target area for input signals from a plurality of microphone arrays, a target area sound extraction unit configured to correct a delay between a target area and each of the microphone arrays, and a power of a target area sound component for an output from the directionality formation unit, suppress a non-target area sound by using each output after correction, and extract a target area sound, an area sound enhancement filter formation unit, and an area sound emphasis unit.

5 Claims, 11 Drawing Sheets

(56) References Cited

U.S. PATENT DOCUMENTS

| | | | | |
|---|---|---|---|---|
| 2015/0063590 | A1* | 3/2015 | Katagiri ................. | H04R 1/406 381/92 |
| 2015/0341734 | A1* | 11/2015 | Sherman .............. | G10K 11/341 381/92 |

* cited by examiner

SOUND COLLECTION APPARATUS AND METHOD

CROSS REFERENCE TO RELATED APPLICATION(S)

This application is based upon and claims benefit of priority from Japanese Patent Application No. 2015-136455, filed on Jul. 7, 2015, the entire contents of which are incorporated herein by reference.

BACKGROUND

The present invention relates of a sound collection apparatus and method, and can be applied to a sound collection apparatus that collects and emphasizes only sounds of a specific direction under an environment where a plurality of sound sources are present.

As technology that collects and emphasizes only sounds of a certain specific direction under an environment where a plurality of sound sources are present, there is a beam former (hereinafter, called a "BF") using microphone arrays. A BF is technology that forms a directionality by using a time difference of signals arriving at a plurality of microphones (refer to Futoshi Asano (Author), "Sound technology series 16: Array signal processing for acoustics: localization, tracking and separation of sound sources", The Acoustical Society of Japan Edition, Corona publishing Co. Ltd, publication date: Feb. 25, 2011).

A BF can be roughly divided into the two types of an addition-type and a subtraction-type. In particular, a subtraction-type BF has the advantage of being able to form a directionality with a small number of microphones, compared to an addition-type BF.

FIG. 3 is a block diagram that shows a configuration of a sound collection apparatus PS in which a conventional subtraction-type BF is adopted. In FIG. 3, a case is illustrated where the sound collection apparatus PS includes two microphones.

When sounds present in a target direction (hereinafter, called "target sounds") arrive at each of the microphones M1 and M2, a delayer DEL calculates a time difference of the signals arriving at the microphones M1 and M2, and causes the phases of the target sounds to match by adding a delay. The time difference is calculated by the following Formula (1).

$$\tau i=(d \sin \theta_L)/c \qquad (1)$$

In Formula (1), d is a distance between the microphones M1 and M2, c is the speed of sound, and ti is a delay amount (time difference). Further, $\theta_L$ is an angle from the vertical direction to the target direction with respect to a straight line connecting the microphones M1 and M2.

Here, in the case where a dead angle is present in the direction of the microphone M1, with respect to the center of the microphones M1 and M2, a delay process is performed for an input signal $x_1(t)$ of the microphone M1. Afterwards, a subtractor SUB performs a subtraction process in accordance with Formula (2).

$$a(t)=x_2(t)-x_1(t-\tau L) \qquad (2)$$

The subtraction process can also be similarly performed in a frequency domain. In this case, Formula (2) is changed as follows.

$$A(\omega)=X_2(\omega)-e^{-j\omega\tau L}X1(\omega) \qquad (3)$$

Here, in the case of $\theta_L=\pm\pi/2$, the directionalities formed by the microphones M1 and M2 become a cardioid-shaped unidirectionality, such as shown in FIG. 4A. On the other hand, in the case of $\theta_L=0, \pi$, the directionalities formed by the microphones M1 and M2 become an 8-shaped bi-directionality, such as shown in FIG. 4B. Hereinafter, a filter that forms a unidirectional from input signals will be called a unidirectional filter, and a filter that forms a bi-directionality will be called a bi-directional filter.

The subtractor SUB can form a directionality that is strong in a dead angle of bi-directionality by using a spectral subtraction technique (hereinafter, called "SS").

The subtractor SUB performs the formation of a directionality by SS in accordance with Formula (4). In Formula (4), the input signal $X_1$ of the microphone M1 is used. Note that a similar effect can also be obtained in the case where the input signal $X_2$ of the microphone M2 is used. Here, β is a coefficient for adjusting the strength of SS. In the case where the value becomes negative at the time of subtraction, a flooring process is performed that replaces the negative value with 0 or a value obtained by reducing the original value. By extracting sounds other than those in a target direction (hereinafter, called "non-target sounds") by the bi-directional filter, and subtracting amplitude spectrums of the extracted non-target sounds from an amplitude spectrum of the input signal, this method can emphasize target sounds.

$$|Y(\omega)|=|X_1(\omega)|-\beta|A(\omega)| \qquad (4)$$

A sharp directionality can be formed in the target sound direction, if using the above subtraction-type BF.

However, in the case where only sounds present within a certain specific area (hereinafter, called "target area sounds") are wanted to be collected, the directionality of the subtraction-type BF will be linear. Accordingly, there will be the problem of sound sources present in the same direction as a target area (hereinafter, called "non-target area sounds") also being collected.

In JP 2014-72708A, a technique has been proposed where target area sounds are collected by directing directionalities from different directions to a target area, using a plurality of microphone arrays MA1 and MA2, and causing the directionalities to intersect at the target area.

SUMMARY

However, since the technology described in JP 2014-72708A performs a spectral subtraction two times in a BF output by microphone arrays, and an extraction of target area sound components, there is the possibility that output target sounds will be distorted.

Further, a problem can also occur where the components of non-target area sounds remain without being sufficiently suppressed at the time when target area sounds are collected under an environment with strong reverberations. For example, in the case where there are reverberations, there is the possibility that non-target area sounds included in the BF output of one of the microphone arrays will be included in the BF output of the other microphone array because of reflections due to a wall or the like. In this case, the non-target area sounds sometimes remain without being completely suppressed, even if an area sound collection process is performed.

Accordingly, a sound collection apparatus and method have been sought after that can reduce distortions of a target area sound component, and suppress components other than target area sounds even under an environment with strong reverberations in an area sound collection process.

The present invention is devised in view of the above-described problem, and includes the following.

A sound collection apparatus according to a first embodiment of the present invention includes: (1) a directionality formation unit configured to form a directionality in a direction of a target area for input signals from a plurality of microphone arrays; (2) a target area sound extraction unit configured to correct a delay between a target area and each of the microphone arrays, and a power of a target area sound component for an output from the directionality formation unit, suppress a non-target area sound by using each output after correction, and extract a target area sound; (3) an area sound enhancement filter formation unit configured to determine the target area sound component from an output of the target area sound extraction unit, form an area sound enhancement filter that suppresses a component other than the target area sound component, additionally calculate a power ratio between outputs from the directionality formation units of the microphone arrays, and change a value of the area sound enhancement filter by determining the component other than the target area sound component based on the power ratio; and (4) an area sound emphasis unit configured to suppress a component other than the target area sound, and emphasize the target area sound by applying the area sound enhancement filter formed by the area sound enhancement filter formation unit to a sound signal collected by the microphone array.

A sound collection program according to a second embodiment of the present invention causes a computer to function as: (1) a directionality formation unit configured to form a directionality in a direction of a target area for input signals from a plurality of microphone arrays; (2) a target area sound extraction unit configured to correct a delay between a target area and each of the microphone arrays, and a power of a target area sound component for an output from the directionality formation unit, suppress a non-target area sound by using each output after correction, and extract a target area sound; (3) an area sound enhancement filter formation unit configured to determine the target area sound component from an output of the target area sound extraction unit, form an area sound enhancement filter that suppresses a component other than the target area sound component, additionally calculate a power ratio between outputs from the directionality formation units of the microphone arrays, and change a value of the area sound enhancement filter by determining the component other than the target area sound component based on the power ratio; and (4) an area sound emphasis unit configured to suppress a component other than the target area sound, and emphasize the target area sound by applying the area sound enhancement filter formed by the area sound enhancement filter formation unit to a sound signal collected by the microphone array.

A sound collection method according to a third embodiment of the present invention includes: (1) forming, by a directionality formation unit, a directionality in a direction of a target area for input signals from a plurality of microphone arrays; (2) correcting, by a target area sound extraction unit, a delay between a target area and each of the microphone arrays, and a power of a target area sound component for an output from the directionality formation unit, suppressing a non-target area sound by using each output after correction, and extracting a target area sound; (3) determining, by an area sound enhancement filter formation unit, the target area sound component from an output of the target area sound extraction unit, forming an area sound enhancement filter that suppresses a component other than the target area sound component, additionally calculating a power ratio between outputs from the directionality formation units of the microphone arrays, and changing a value of the area sound enhancement filter by determining the component other than the target area sound component based on the power ratio; and (4) suppressing, by an area sound emphasis unit, a component other than the target area sound, and emphasizing the target area sound by applying the area sound enhancement filter formed by the area sound enhancement filter formation unit to a sound signal collected by the microphone array.

As described above, according to an embodiment of the present invention, distortions of a target area sound component can be reduced, and components other than target area sounds can be suppressed even under an environment with strong reverberations by forming a filter by using a ratio of respective beam former outputs of a plurality of microphone arrays in an area sound collection process.

DETAILED DESCRIPTION OF THE EMBODIMENT(S)

Figure 1:
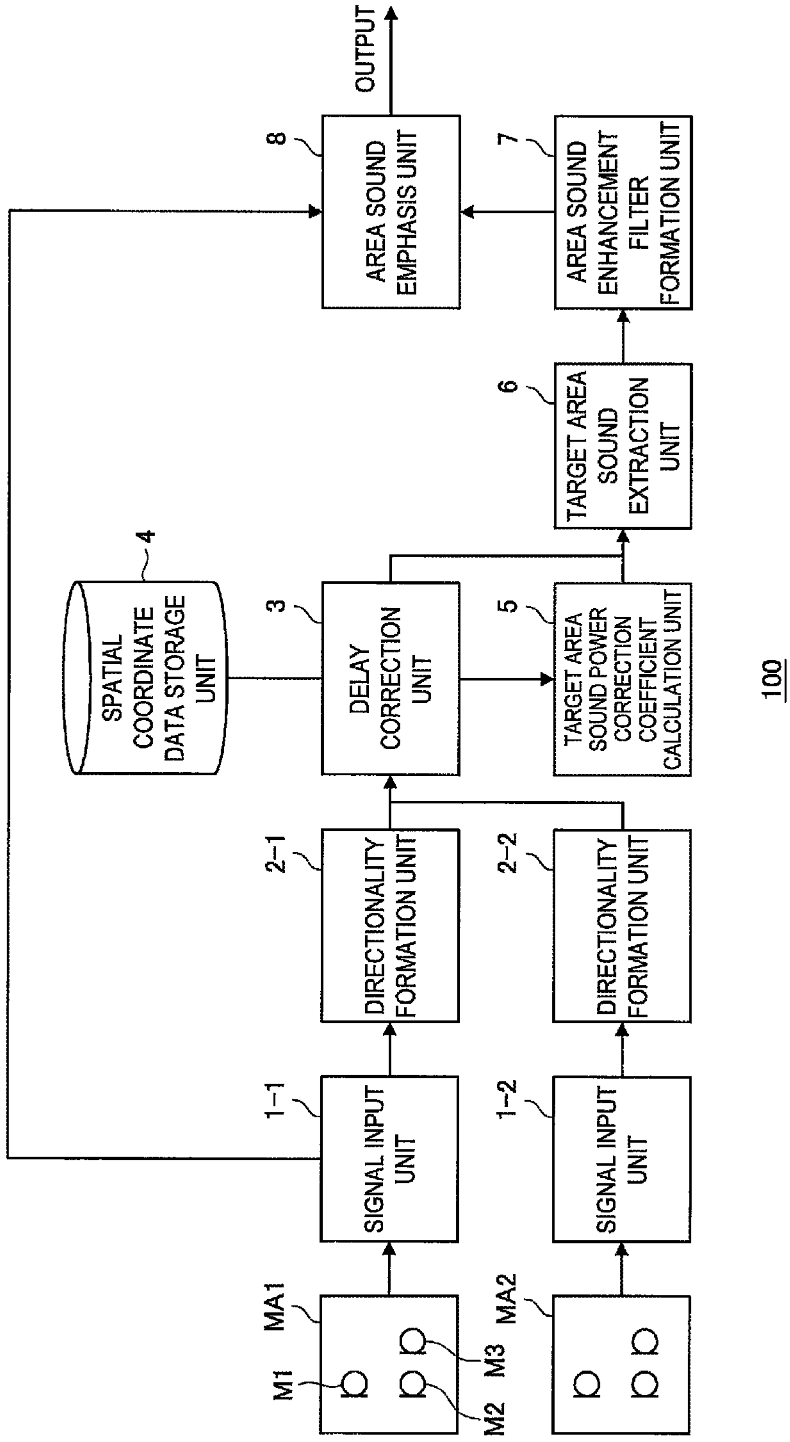
FIG. 1 is a block diagram that shows a configuration of a sound collection apparatus according to a first embodiment.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

(A) Basic Concept According to an Embodiment of the Present Invention

The technique described in JP 2014-72708A can collect target area sounds by performing calculations in accordance with Formula (7) and Formula (8), which will be described below, even if non-target area sounds are present in the surroundings of an area to be set to a target.

However, a spectral subtraction (SS) is performed two times in the BF output of the microphone arrays MA1 and MA2 in accordance with Formula (4), and the extraction of a target area sound component in accordance with Formula (8). Accordingly, there is the possibility that output target area sounds will be distorted.

In addition, there is the problem that non-target area sounds will remain without being sufficiently suppressed under an environment with strong reverberations.

Figure 5A:
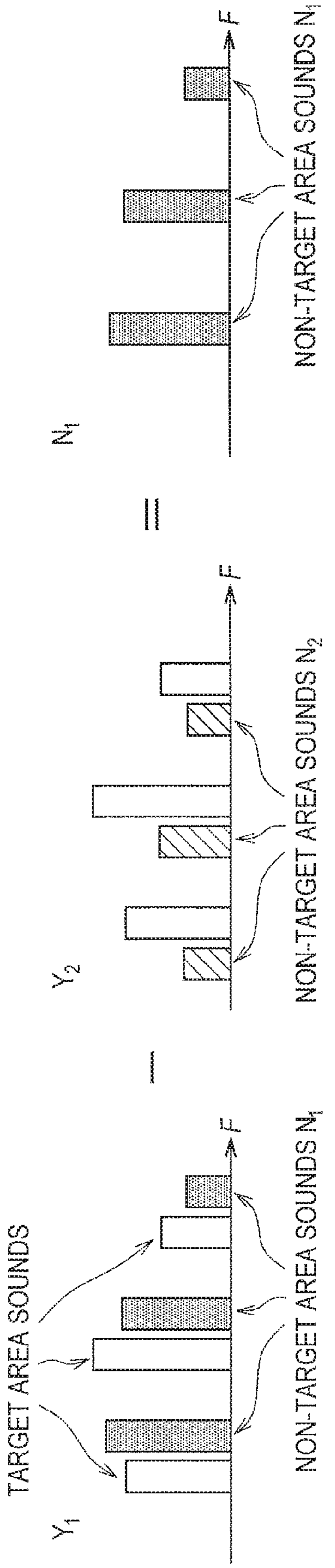
FIG. 5A is a figure that shows a change of an amplitude spectrum of each component in an area sound collection process under an environment with no reverberations.
Figure 5B:
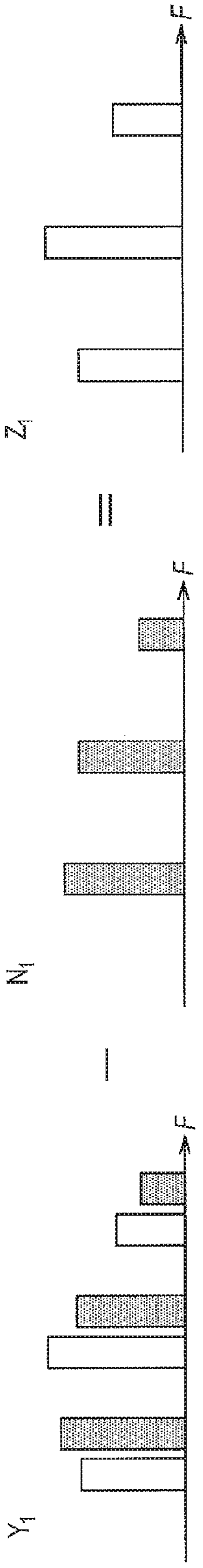
FIG. 5B is a figure that shows a change of an amplitude spectrum of each component in an area sound collection process under an environment with no reverberations.

FIGS. 5A and 5B are figures that each show a change of an amplitude spectrum of each component in an area sound collection process under an environment with no reverberations. In particular, FIG. 5A is a figure that shows extraction of non-target area sounds included in BF output $Y_1$ of the microphone array MA1. In addition, FIG. 5B is a figure that shows extraction of target area sounds included in BF output $Y_1$ of the microphone array MA1.

As shown in FIG. 5A, target area sounds, and non-target area sounds $N_1$ present in a target area direction are included in a BF output $Y_1$ of the microphone array MA1. Further, target area sounds, and non-target area sounds $N_2$ are included in a BF output $Y_2$ of the microphone array MA2.

A target area sound extraction unit 6 performs SS for the multiplication of a correction coefficient $\alpha_1$ by the BF output $Y_2$ from the BF output $Y_1$ in accordance with Formula (7) in order to extract $N_1$. In this way, target area sounds commonly included in the BF output $Y_1$ and the BF output $Y_2$ are suppressed, and the non-target area sounds $N_1$ included in the BF output $Y_1$ remain (refer to FIG. 5A). At this time, the non-target area sounds $N_2$ included in the BF output $Y_2$ are not included in the BF output $Y_1$. Accordingly, while this component (the non-target area sounds $N_2$) has a negative value when SS is performed, there will be no influence because a flooring process is performed.

Afterwards, when the target area sound extraction unit 6 performs SS for the non-target area sounds $N_1$ from the BF output $Y_1$ in accordance with Formula (8), the non-target area sounds $N_1$ can be completely suppressed, and only the target area sounds can be extracted (refer to FIG. 5B). Note that, in Formula (8), $\gamma_1$ is a coefficient for changing the strength at the time of SS.

Figure 6:
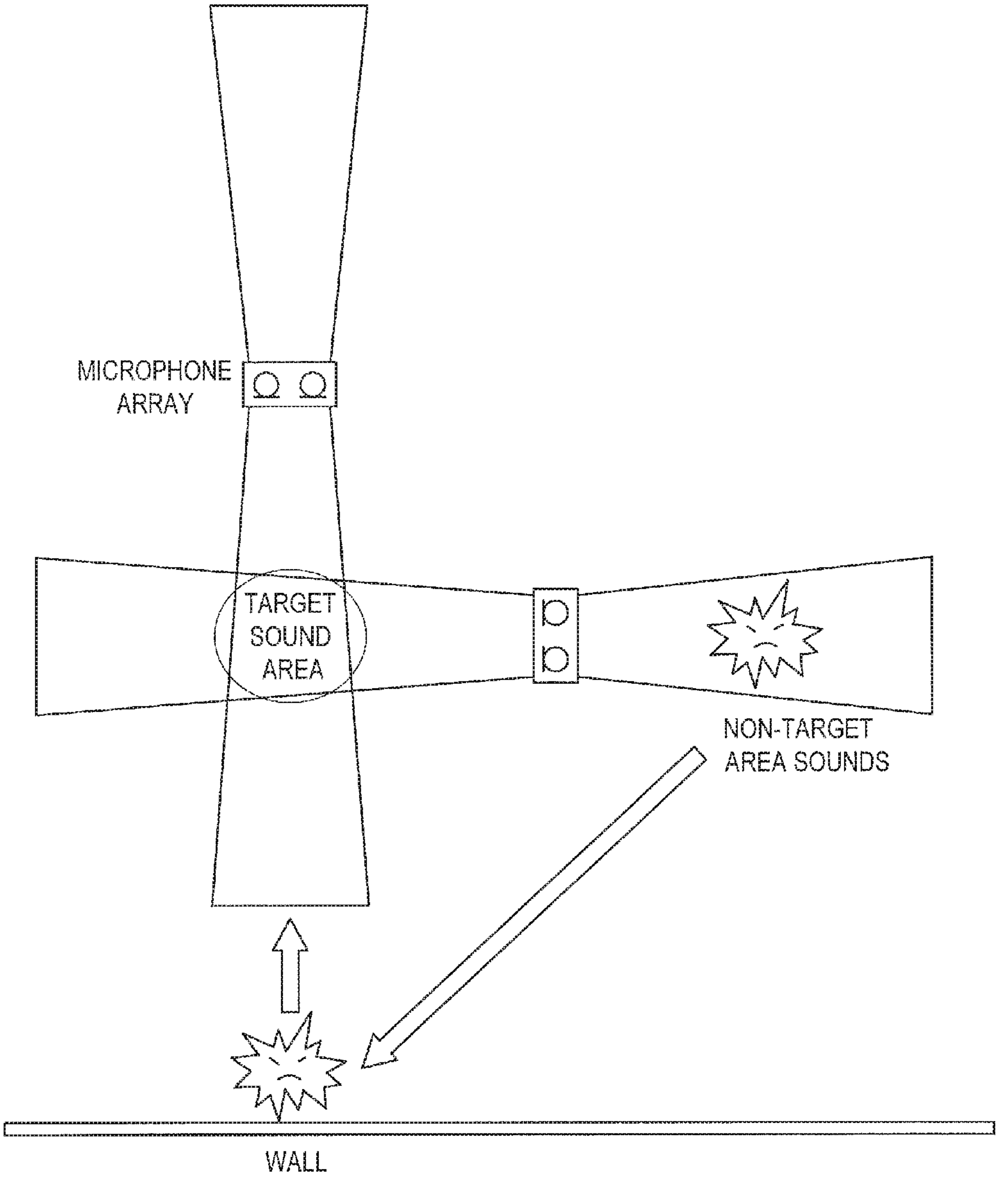
FIG. 6 is a figure that shows a situation where non-target area sounds are simultaneously included in each BF output due to reverberations.

However, as shown in FIG. 6, when there are reverberations, there is the possibility that non-target area sounds included in one of the BF outputs will be included in the other BF output by reflecting on a wall.

Figure 7A:
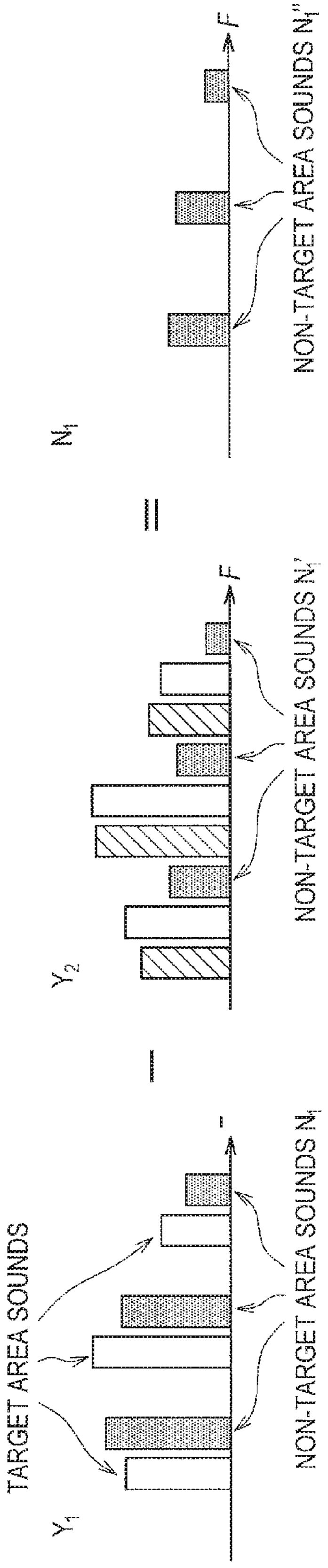
FIG. 7A is a figure that shows a change of an amplitude spectrum of each component in an area sound collection process of the case where non-target area sounds (direct sounds) are included in a BF output of a microphone array 1, and non-target area sounds (reflected sounds) are included in a BF output of a microphone array 2.
Figure 7B:
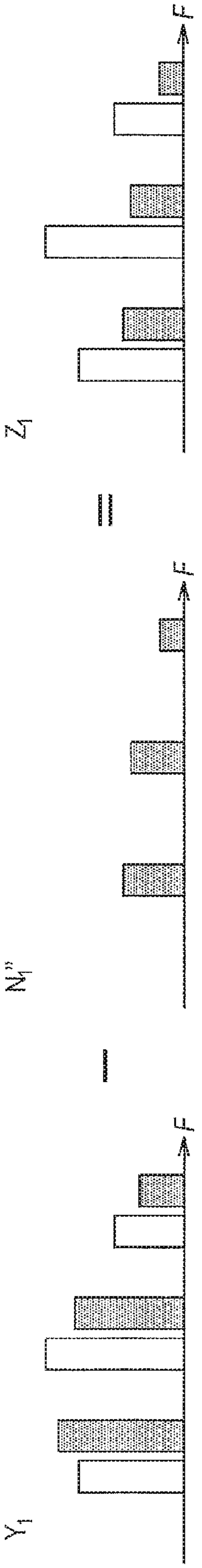
FIG. 7B is a figure that shows a change of an amplitude spectrum of each component in an area sound collection process of the case where non-target area sounds (direct sounds) are included in a BF output of a microphone array 1, and non-target area sounds (reflected sounds) are included in a BF output of a microphone array 2.

FIGS. 7A and 7B are figures that each show a change of an amplitude spectrum of each component in an area sound collection process of the case where non-target area sounds (direct sounds) are included in the BF output $Y_1$ of the microphone array MA1, and non-target area sounds (reflected sounds) are included in the BF output $Y_2$ of the microphone array MA2. In particular, FIG. 7A is a figure that shows extraction of non-target area sounds included in BF output $Y_1$ of the microphone array MA1. In addition, FIG. 7B is a figure that shows extraction of target area sounds included in BF output $Y_1$ of the microphone array MA1.

In the case of FIGS. 7A and 7B, different to the case of FIGS. 5A and 5B, reflected sounds $N_1'$ of the non-target area sounds $N_1$ are included in the BF output $Y_2$. Accordingly, when SS is performed for the BF output $Y_2$ from the BF output $Y_1$, not only target area sounds, but also the non-target area sounds $N_1$ will be suppressed, and extracted non-target area sounds $N_1''$ will have a power smaller than that of the original non-target area sounds $N_1$ (refer to FIG. 7A).

Accordingly, even if SS is performed for the non-target area sounds $N_1''$ from the BF output $Y_1$, it will not be possible to completely suppress the non-target area sounds $N_1$ included in the BF output $Y_1$, and the non-target area sounds $N_1$ will remain in a target area sound output $Z_1$ (refer to FIG. 7B).

For these problems, the inventor of the present invention has proposed a technique that forms a filter based on the output of SS without outputting the output of SS as it is as target sounds, and causes distortions of target sounds to be reduced by applying this filter to an input signal (Reference Literature: JP 2015-38628A).

In the technique described in the above Reference Literature, first, a filter is formed that sets a value to 0 for components with a power at a threshold or less, which are determined to be non-target sounds, from among components extracted by SS, and sets a value to 1 for components other than these. In addition, the power of the SS output is divided by powers of the input signal, these are compared with a different threshold, and the value of the filter is changed to 0 for components at this threshold or less. Finally, only non-target sound components are suppressed by applying this filter to the input signal without providing an influence on a target sound component.

If the technique described in the above Reference Literature is applied to an area sound collection process, deterioration of a target area sound component due to SS can be prevented. Further, for the problem where non-target area sounds remain because of reverberations, since a ratio of the power of the SS output and the power of the input signal is used at the time of the formation of the filter, the remaining non-target area sound components can be suppressed.

In the situation shown in FIGS. 7A and 7B, when a power ratio of the target area sound output $Z_1$ and $Y_1$ is obtained, the target area sound component will approach 1. Further, since the non-target area sounds are suppressed even though they remain, they will become a value smaller than 1. By using this difference and forming a filter, it is possible to perform an area sound collection process under an environment with strong reverberations.

Figure 8A:
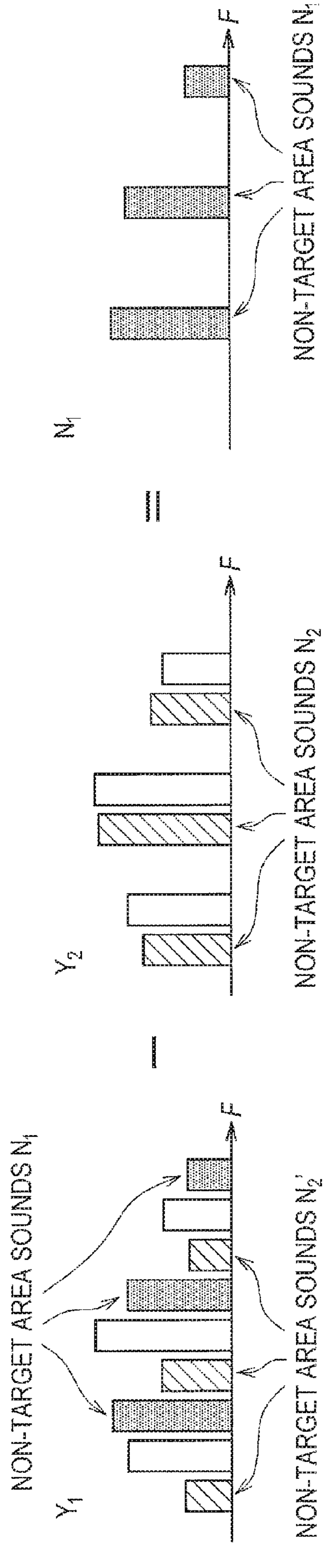
FIG. 8A is a figure that shows a change of an amplitude spectrum of each component in an area sound collection process of the case where non-target area sounds (reflected sounds) are included in a BF output of a microphone array 1, and non-target area sounds (direct sounds) are included in a BF output of a microphone array 2.
Figure 8B:
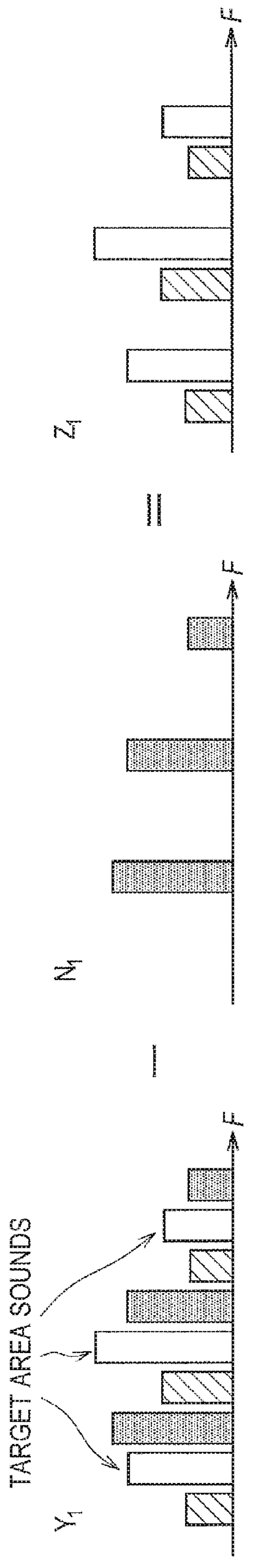
FIG. 8B is a figure that shows a change of an amplitude spectrum of each component in an area sound collection process of the case where non-target area sounds (reflected sounds) are included in a BF output of a microphone array 1, and non-target area sounds (direct sounds) are included in a BF output of a microphone array 2.

However, in an area sound collection process, not only the situation shown in FIGS. 7A and 7B, but also a situation where not direct sounds, but reflected sounds are included in the BF output $Y_1$ of the microphone array MA1 as shown in FIGS. 8A and 8B can be considered.

FIGS. 8A and 8B are figures that each show a change of an amplitude spectrum of each component in an area sound collection process of the case where non-target area sounds (reflected sounds) are included in the BF output of the microphone array 1, and non-target area sounds (direct sounds) are included in the BF output of the microphone array 2. In particular, FIG. 8A is a figure that shows extraction of non-target area sounds included in BF output $Y_1$ of the microphone array MA1. In addition, FIG. 8B is a figure that shows extraction of target area sounds included in BF output $Y_1$ of the microphone array MA1.

In such a situation, not only the non-target area sounds $N_1$, but also non-target target area sounds $N_2'$, which are reflected sounds of the non-target area sounds $N_2$, are included in the BF output $Y_1$.

Although the non-target area sounds $N_1$ can be extracted even if SS is performed for the BF output $Y_2$ from the BF output $Y_1$ in order to extract the non-target area sounds, the non-target area sounds $N_2$ included in the BF output $Y_2$ will have a power greater than that of the non-target area sounds $N_2'$, and be completely suppressed, so that it is not possible to extract them (refer to FIG. 8A).

Although the non-target area sounds $N_1$ can be suppressed afterwards even if SS is performed for the non-target area sounds $N_1$ from the BF output $Y_1$, the non-target area sounds $N_2'$ will remain as they are (refer to FIG. 8B).

Accordingly, in such a situation, even if a power ratio of the target area sound output $Z_1$ and the BF output $Y_1$ is obtained, the powers of the non-target area sounds $N_2'$ included in the target area sound output $Z_1$ and the BF output $Y_1$ will be the same, and so the power ratio will approach "1", it will not be possible to make a distinction with the target area sound component, and it will not be possible to form a filter that suppresses the non-target area sounds $N_2'$.

Accordingly, in a first embodiment of the present invention, a power ratio of the BF outputs of each of the microphone arrays is used, and not a power ratio of the input and output signals, when a filter is formed.

Usually, it is difficult to decide whether a non-target area sound component included in each BF output is a direct sound or a reflected sound. However, since a reflected sound has a power that is smaller than that of a direct sound, it is assumed to become a value less than, or greater than, "1", when a ratio of each of the BF outputs is obtained.

Further, since the target area sound component is included in each of the BF outputs with the same size, the ratio will approach 1. By using this difference, it becomes possible to form a filter that can emphasize only target area sounds even under an environment with strong reverberations.

(B) First Embodiment

Hereinafter, a sound collection apparatus and method according to a first embodiment of the present invention will be described in detail while referring to the figures.

(B-1) Configuration of the First Embodiment

FIG. 1 is a block diagram that shows an internal configuration of a sound collection apparatus according to the first embodiment.

A sound collection apparatus 100 according to the first embodiment collects target area sounds from a sound source of a target area by using the two microphone arrays MA1 and MA2.

The microphone arrays MA1 and MA2 have at least two or more microphones. In FIG. 1, a case is illustrated where the microphone array MA1 has three microphones M1 to M3. The microphone array MA1 is arranged so that the microphones M1 and M2 become horizontal with respect to the direction of the target area. In addition, the microphone M3 is arranged orthogonal to a straight line connecting the microphones M1 and M2 on a straight line taking either of the microphones M1 and M2. That is, a case is illustrated where the three microphones M1, M2 and M3 are arranged at the apexes of an isosceles right triangle. Note that, in this embodiment, the microphone array MA2 also has a configuration similar to that of the microphone array MA1.

The microphone arrays MA1 and MA2 are provided at arbitrary locations in a space where the target area is present. The positions of the microphone arrays MA1 and MA2 with respect to the target area will not be particularly limited, if the directionalities of the microphone arrays MA1 and MA2 are overlapping only in the target area. For example, the microphone arrays MA1 and MA2 may be arranged so that the directionalities of the microphone array MA1 and the microphone array MA2 are intersecting with respect to the target area. Further, for example, the microphone arrays MA1 and MA2 may be arranged so that the microphone arrays MA1 and MA2 face each other by sandwiching the target area.

Note that the number of microphone arrays is not limited to two, and in the case where a plurality of target areas are present, microphone arrays enough to cover all of the areas may be arranged.

In FIG. 1, the sound collection apparatus 100 according to the first embodiment has a signal input unit 1-1, a signal input unit 1-2, a directionality formation unit 2-1, a directionality formation unit 2-2, a delay correction unit 3, a spatial coordinate data storage unit 4, a target area sound power correction coefficient calculation unit 5, a target area sound extraction unit 6, an area sound enhancement filter formation unit 7, and an area sound emphasis unit 8. A specific description of each of the configuration elements constituting the sound collection apparatus 100 will be given below.

The sound collection apparatus 100 may be entirely constituted by hardware (for example, an exclusive chip or the like), or may be constituted as software (a program or the like) for a part or all. The sound collection apparatus 100 may be constructed, for example, by installing a sound collection program of the first embodiment in a computer having a processor and a memory.

(B-2) Operation According to the First Embodiment

Next, the operation of the sound collection apparatus 100 according to the first embodiment for a sound collection process will be described in detail while referring to the figures.

The microphone arrays MA1 and MA2 each collect sound signals by the three microphones M1, M2, and M3. The sound signals collected by the microphone array MA1 are provided to the signal input unit 1-1. Further, the sound signals collected by the microphone array MA2 are provided to the signal input unit 1-2.

The signal input units 1-1 and 1-2 respectively input the sound signals from the microphone arrays MA1 and MA2 by converting the sound signals from analogue signals into digital signals. Afterwards, the signal input units 1-1 and 1-2 convert the input signals from the microphone arrays MA1 and MA2 from a time domain into a frequency domain, for example, by using a Fast Fourier Transform or the like, and provide the converted input signals to the directionality formation units 2-1 and 2-2.

The directionality formation units 2-1 and 2-2 respectively form directionalities of the signals from the microphone arrays MA1 and MA2 by a beam former (BF). In this embodiment, the directionality formation units 2-1 and 2-2 form directionalities in front of the microphone arrays MA1 and MA2 with respect to the target area direction for each of the microphone arrays MA1 and MA2 by a BF in accordance with Formula (4).

For example, the directionality formation units 2-1 and 2-2 form bi-directional filters at the microphones M1 and M2 arranged side-by-side on a line orthogonal to the target area, and form unidirectional filters towards a dead angle in the target direction at the microphones M2 and M3 arranged side-by-side on a line parallel to the target direction. Specifically, the directionality formation units 2-1 and 2-2 set $\theta_L=0$ for the output signals of the microphones M1 and M2, perform calculations in accordance with Formula (1) and Formula (3), and form bi-directional filters in accordance with Formula (4). Further, the directionality formation units 2-1 and 2-2 set $\theta_L=-\pi/2$ for the output signals of the microphones M2 and M3, perform calculations in accordance with Formula (1) and Formula (3), and form unidirectional filters in accordance with Formula (4).

In the directionality formation units 2-1 and 2-2, since the directionalities of the microphone arrays MA1 and MA2 are formed only in front by a BF, the influence of reverberations invading from behind (the opposite direction to the target area when viewed from the microphone array) can be reduced. Further, in the directionality formation units 2-1 and 2-2, non-target area sounds positioned behind each of the microphone arrays MA1 and MA2 can be suppressed beforehand by each BF, and an SN ratio of the sound collection process of the target area can be improved.

The spatial coordinate data storage unit 4 retains position information of the all target areas (that is, position information showing the range of the target areas), position information of each of the microphone arrays MA1 and MA2, and position information of the microphones M1 to M3 constituting each of the microphone arrays MA1 and MA2. The specific form or display units of the position information stored by the spatial coordinate data storage unit 4 will not be limited as long as a relative position relationship between the target area and each of the microphone arrays MA1 and MA2 can be recognized.

The delay correction unit 3 calculates and corrects a delay generated by a difference in the distance between the target area and each of the microphone arrays.

The delay correction unit 3 first acquires position information of the target area and position information of the microphone arrays MA1 and MA2 from the spatial coordinate data storage unit 4, and calculates a difference in the arrival times of the target area sounds to each of the microphone arrays MA1 and MA2. Next, the delay correction unit 3 adds a delay (delay time difference) so that the target area sounds simultaneously arrive at all of the microphone arrays MA1 and MA2, and causes the phases to match on the basis of the microphone array MA1 or MA2 arranged at a position the furthest from the target area.

The target area sound power correction coefficient calculation unit 5 calculates a correction coefficient (also called a "power correction coefficient") for setting the power of the target area sound component included in each of the BF outputs to be the same in accordance with Formula (5) or Formula (6).

The target area sound power correction coefficient calculation unit 5 first estimates a ratio of the powers of the target area sounds included in the BF outputs $Y_1$ and $Y_2$ of each of the microphone arrays MA1 and MA2, and sets this to a correction coefficient.

$$\alpha_1 = \mathrm{mode}\left(\frac{Y_{1k}}{Y_{2k}}\right)\ k = 1, 2, \ldots, N \tag{5}$$

$$\alpha_1 = \mathrm{median}\left(\frac{Y_{1k}}{Y_{2k}}\right)\ k = 1, 2, \ldots, N \tag{6}$$

Here, in Formula (5) and Formula (6), $Y_{1k}$ and $Y_{2k}$ are amplitude spectrums of the BF outputs of the microphone arrays MA1 and MA2, N is the total number of frequency bins, k is a frequency, and $\alpha_1$ is a power correction coefficient for each of the BF outputs. Further, mode represents a mode value, and median represents a median value.

The target area sound extraction unit 6 corrects each of the BF outputs by using the correction coefficient calculated by the target area sound power correction coefficient calculation unit 5. Next, the target area sound extraction unit 6 performs a spectral subtraction technique (SS) in accordance with Formula (7), by using each of the BF outputs corrected by the correction coefficient, and extracts noise (that is, non-target area sounds) present in the target area direction. In addition, the target area sound extraction unit 6 extracts target area sounds from each of the BF outputs by performing SS for the extracted noise in accordance with Formula (8).

$$N_1 = Y_1 - \alpha_1 Y_2 \tag{7}$$

$$Z_1 = Y_1 - \gamma_1 N_1 \tag{8}$$

The area sound enhancement filter formation unit 7 sets an output signal of the target area sound extraction unit 6 to an estimated target area component, compares the power of each component and a threshold, and forms an area sound enhancement filter based on this comparison result.

Specifically, the area sound enhancement filter formation unit 7 sets the output $Z_1$ of the target area sound extraction unit 6 to an estimated target area component, and compares the power of each component and a threshold $T_1$. Then, the area sound enhancement filter formation unit 7 forms an area sound enhancement filter $H_1$, which sets components smaller than the threshold $T_1$ to "0" and components other than these to "1". Here, k is a frequency.

$$H_{1k} = \begin{cases} 0 & (Z_{1k} \leq T_1) \\ 1 & (\text{otherwise}) \end{cases} \tag{9}$$

In addition, the area sound enhancement filter formation unit 7 calculates a ratio P of the BF outputs in accordance with Formula (10). By calculating a ratio $P_k$ between the BF outputs $Y_{1k}$ and $Y_{2k}$ by Formula (10), it becomes possible for the non-target area sound component to be determined regardless of a direct sound and a reflected sound.

$$P_k = \left|1 - \frac{Y_{2k}}{Y_{1k}}\right| \tag{10}$$

Next, the area sound enhancement filter formation unit 7 compares the ratio P of the BF outputs calculated by Formula (10) and a different threshold $T_2$. Then, the filter values of components larger than the threshold $T_2$ are changed to 0. Note that the area sound enhancement filter formation unit 7 may have the filter values of components other than the target area sounds set to "an arbitrary value from 0 up to 1", and not "0".

The value of $P_k$ approaches "0", if it is a target area sound component, and the possibility that it is a non-target area sound becomes greater as the value increases. Accordingly, the components with a value of $P_k$ larger than $T_2$ are changed to "0", from among the components with a value of $H_1$ of "1", for example, by setting the threshold $T_2$ to "0.5", and the value of the area sound enhancement filter $H_1$ is updated (Formula (11)).

$$H_{1k} = \begin{cases} 0 & (P_k \geq T_2) \\ 1 & (otehwise) \end{cases} \tag{11}$$

The area sound emphasis unit 8 applies the area sound enhancement filter $H_1$ formed by the area sound enhancement filter formation unit 7 to an input signal $X_1$ of the signal input unit 1-1 in accordance with Formula (12), suppresses components other than the target area sounds, and emphasizes the target area sounds.

$$\Omega_1 = H_1 X_1 \tag{12}$$

Here, the value of the filter $H_1$ does not have to be the two values of "0" and "1", but can be set to "an arbitrary value from 0 up to 1", and an SN ratio can be operated. For example, if a setting is performed to suppress components other than the target area sounds by 20 dB, non-target area sounds will remain as a part of the environment sounds without being completely suppressed.

(B-3) Effect of the First Embodiment

As described above, according to the first embodiment, by forming a filter by using a ratio of the respective BF outputs of a plurality of microphone arrays, in an area sound collection process, distortions of a target area sound component can be reduced, and components other than target area sounds can be suppressed even under an environment with strong reverberations.

(C) Second Embodiment

Next, a sound collection apparatus and method according to a second embodiment of the present invention will be described in detail while referring to the figures.

(C-1) Configuration According to the Second Embodiment

Figure 2:
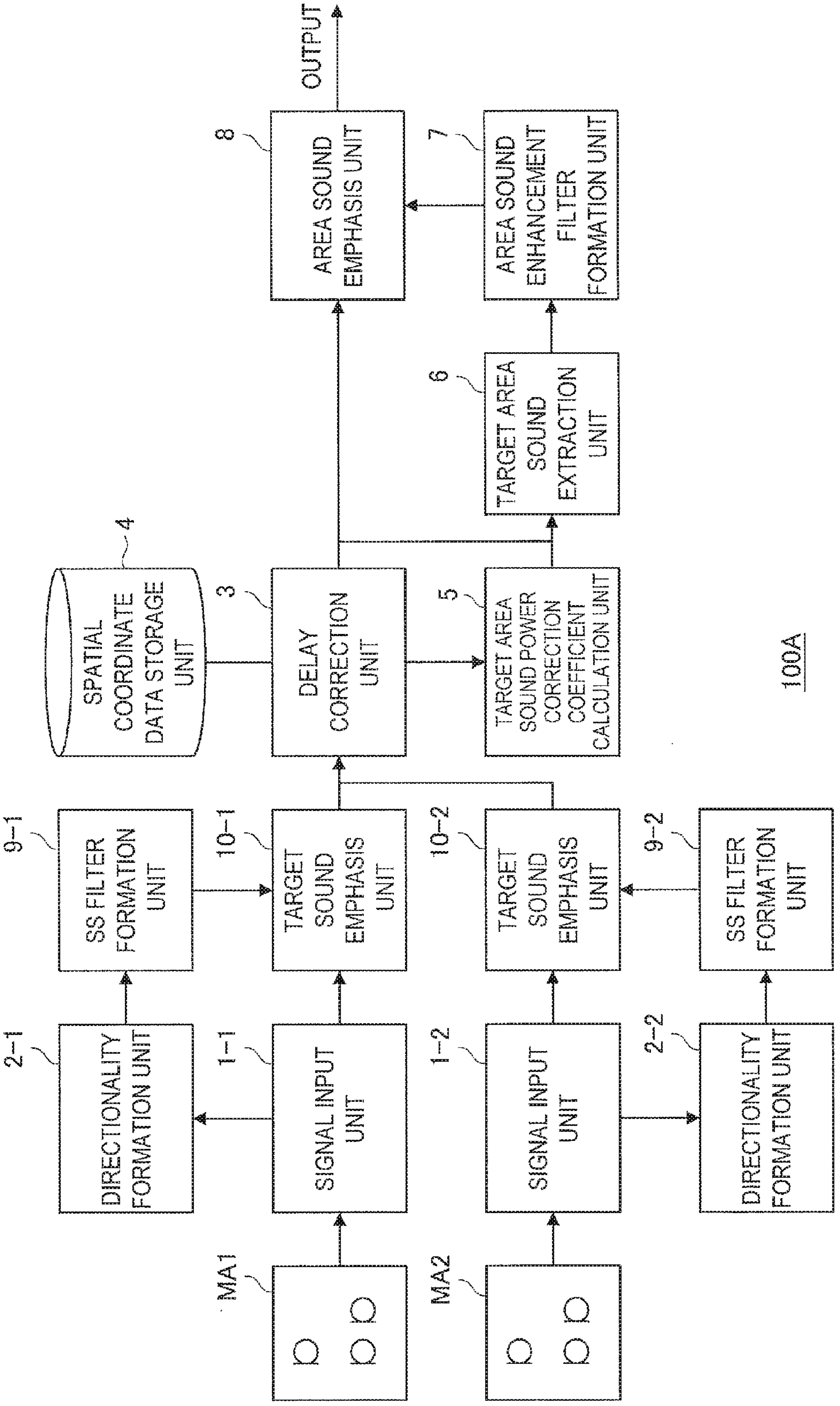
FIG. 2 is a block diagram that shows a configuration of a sound collection apparatus according to a second embodiment.
Figure 3:
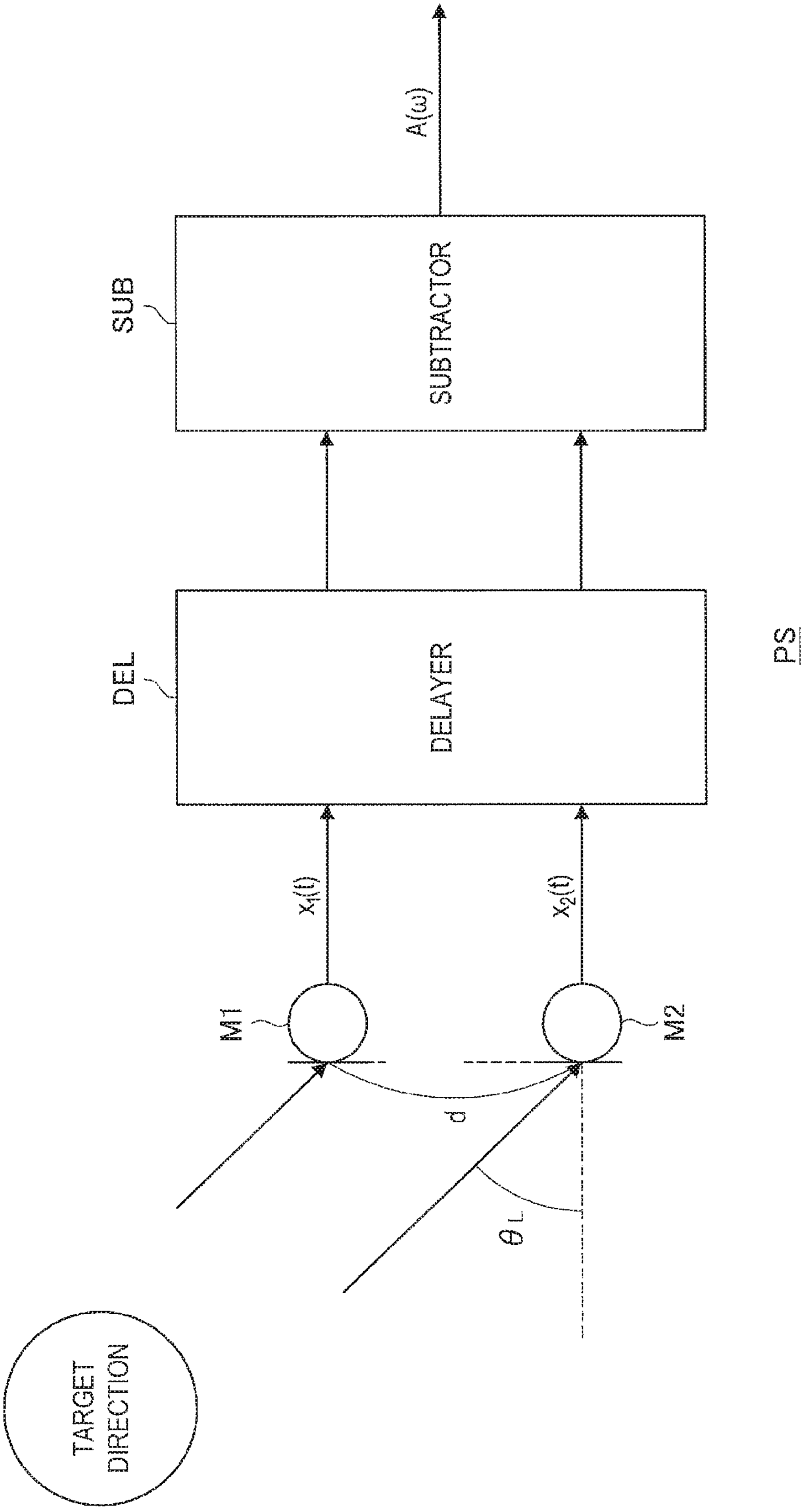
FIG. 3 is a block diagram that shows a configuration relating to a subtraction-type BF of the case where sounds are collected by two microphones.
Figure 4A:
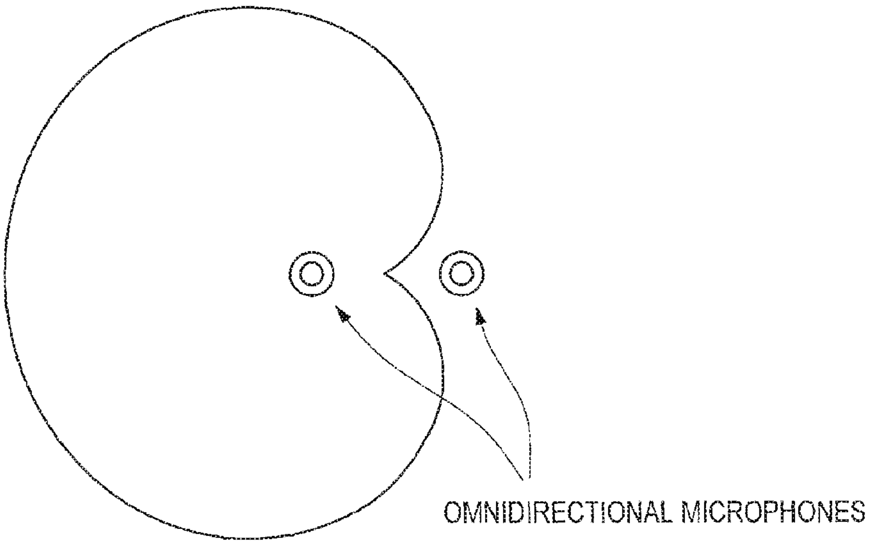
FIG. 4A is a figure that shows directionality characteristics formed by the subtraction-type BF by using two microphones.
Figure 4B:
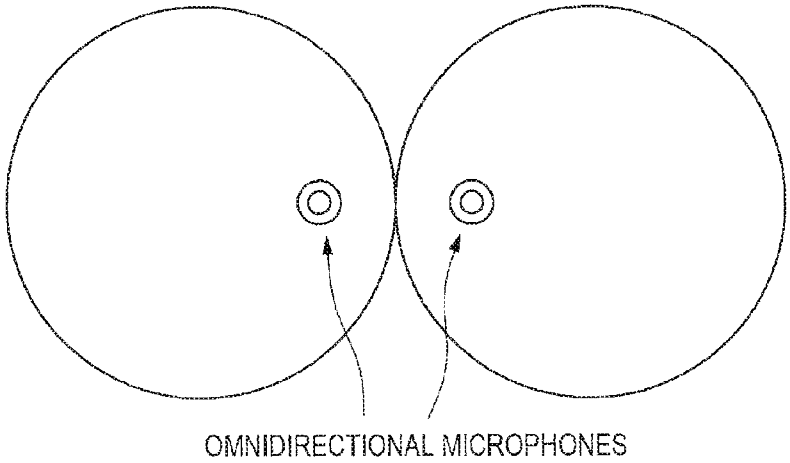
FIG. 4B is a figure that shows directionality characteristics formed by the subtraction-type BF by using two microphones.

FIG. 2 is a block diagram that shows an internal configuration of a sound collection apparatus 100A according to the second embodiment.

Similar to the first embodiment, the sound collection apparatus 100A of the second embodiment also collects target area sounds from a sound source of a target area by using the two microphone arrays MA1 and MA2.

In FIG. 2, in addition to the signal input unit 1-1, the signal input unit 1-2, the directionality formation unit 2-1, the directionality formation unit 2-2, the delay correction unit 3, the spatial coordinate data storage unit 4, the target area sound power correction coefficient calculation unit 5, the target area sound extraction unit 6, the area sound enhancement filter formation unit 7, and the area sound emphasis unit 8 described in the first embodiment, the sound collection apparatus 100A has an SS filter formation unit 9-1, an SS filter formation unit 9-2, a target sound emphasis unit 10-1, and a target sound emphasis unit 10-2.

The second embodiment adds a function for emphasizing target sounds, at the time when forming a directionality by a BF for input signals from each of the microphone arrays MA1 and MA2, to the process described in the first embodiment, by forming a filter that suppresses components other than a target sound component based on an output of SS, and applying this filter to the input signals.

Further, the area sound emphasis unit 8 is changed so as to receive an output of the delay correction unit 3, and not an output of the signal input unit 1-1.

(C-2) Operation According to the Second Embodiment

Next, the operation of the sound collection apparatus 100A according to the second embodiment for a sound collection process will be described in detail with reference to the figures.

Sound signals collected by the microphone array MA1 are provided to the signal input unit 1-1. Further, sound signals collected by the microphone array MA2 are provided to the signal input unit 1-2.

The signal input units 1-1 and 1-2 respectively input the sound signals from the microphone arrays MA1 and MA2 by converting the sound signals from analogue signals into digital signals. Afterwards, the signal input units 1-1 and 1-2 convert the input signals from the microphone arrays MA1 and MA2 from a time domain into a frequency domain, for example, by using a Fast Fourier Transform or the like, and provide the converted input signals to the directionality formation units 2-1 and 2-2, and the target sound emphasis units 10-1 and 10-2.

Similar to the first embodiment, the directionality formation units 2-1 and 2-2 respectively form directionalities in front of the microphone arrays MA1 and MA2 with respect to the target area direction for each of the microphone arrays MA1 and MA2 by a BF in accordance with Formula (4).

The SS filter formation units 9-1 and 9-2 respectively form filters H21 and H22 based on the outputs of the directionality formation units 2-1 and 2-2. Here, the filters H21 and H22 determine that components with a power at a threshold $T_3$ or greater are target sounds, and sets the target sound component to "1", and components other than this to "0". Note that the values of the filters for the components other than the target sounds may be set to "an arbitrary value from 0 up to 1", and not "0".

Afterwards, the SS filter formation units 9-1 and 9-2 correct the values of the filters by using power ratios $R_{1k}$ and $R_{2k}$ of the outputs from the directionality formation units 2-1 and 2-2 and the input signals. The power ratios $R_{1k}$ and $R_{2k}$ are calculated for each frequency in accordance with Formulas (13) and (14). Here, $Y_{1k}$ and $Y_{2k}$ are respective powers of the kth frequency of the outputs of the directionality formation units 2-1 and 2-2, and $X_{1k}$ and $X_{2k}$ are respective powers of the kth frequency of the outputs of the signal input units 1-1 and 1-2. For example, the components with $R_{1k}$ and $R_{2k}$ at a threshold $T_4$ or less, and having a power exceeding the threshold $T_3$ are determined to be non-target sound components, and the values of the filters are changed from "1" to "0".

$$R_{1k} = Y_{1k}/X_{1k} \tag{13}$$

$$R_{2k} = Y_{2k}/X_{2k} \tag{14}$$

The target sound emphasis units 10-1 and 10-2 respectively apply the filters formed by the SS filter formation units 9-1 and 9-2 to the outputs of the signal input units 1-1 and 1-2, suppress the non-target sound components, and emphasize the target sounds (Formulas (15) and (16)). Here, $X_1$ and $X_2$ are powers of the outputs of the signal input units 1-1 and 1-2.

$$\Xi_1=H_{21}X_1 \quad (15)$$

$$\Xi_2=H_{22}X_2 \quad (16)$$

The delay correction unit 3 first acquires position information of the target area and position information of the microphone arrays MA1 and MA2 from the spatial coordinate data storage unit 4, and calculates a difference in the arrival times of the target area sounds to each of the microphone arrays MA1 and MA2.

Next, the delay correction unit 3 adds a delay (delay time difference) so that the target area sounds simultaneously arrive at all of the microphone arrays MA1 and MA2, and causes the phases to match by using each of the outputs for which the target sounds have been emphasized by the target sound emphasis units 10-1 and 10-2, on the basis of the microphone array MA1 or MA2 arranged at a position the furthest from the target area.

Similar to the first embodiment, the target area sound power correction coefficient calculation unit 5 calculates a correction coefficient for setting the power of the target area sound component included in each of the outputs from the target sound emphasis units 10-1 and 10-2 to be the same in accordance with Formula (5) or Formula (6).

The target area sound extraction unit 6 corrects each of the outputs of the target sound emphasis units 10-1 and 10-2 by using the correction coefficient calculated by the target area sound power correction coefficient calculation unit 5. Next, the target area sound extraction unit 6 performs a spectral subtraction technique (SS) in accordance with Formula (7) by using each of the outputs corrected by the correction coefficient, and extracts noise (that is, non-target area sounds) present in the target area direction. In addition, the target area sound extraction unit 6 extracts target area sounds from each of the BF outputs by performing SS for the extracted noise in accordance with Formula (8).

The area sound enhancement filter formation unit 7 sets an output signal of the target area sound extraction unit 6 to an estimated target area component, compares the power of each component and a threshold, and forms an area sound enhancement filter based on this comparison result.

The area sound emphasis unit 8 applies the area sound enhancement filter $H_1$ formed by the area sound enhancement filter formation unit 7 to an output signal from the delay correction unit 3, suppresses components other than the target area sounds, and emphasizes the target area sounds.

(C-3) Effect of the Second Embodiment

As described above, according to the second embodiment, target sounds are emphasized by forming a filter that suppresses components other than a target sound component based on an output of SS, and applying this filter to the input signals at the time when a directionality is formed by a BF for input signals from each microphone array. Even in this case, according to the second embodiment, an effect similar to that of the first embodiment is accomplished.

(D) Other Embodiments

The present invention is not limited to each of the above-described embodiments, and can be applied to modified embodiments as illustrated below.

(D-1) Although each of the above-described embodiments shows that sound signals obtained by being caught by microphones are processed in real time, the sounds signals obtained by being caught by microphones may be stored in a recording medium, and afterwards, target sounds, and emphasized signals of target area sounds may be obtained by performing reading and processing from the recording medium. In this way, in the case where a recording medium is used, the location where the microphones are set, and the location where an extraction process of target sounds and target area sounds is performed may be separated. Similarly, even in the case where processing is performed in real time, the location where the microphones are set, and the location where an extraction process of target sounds and target area sounds is performed may be separated, and signals may be supplied to a remote location by communication.

(D-2) Each of the above-described embodiments have illustrated a case where the area sound enhancement filter formation unit changes the values of the filters in accordance with Formula (10). Although a case has been illustrated where $P_k=(1-Y_{2K}/Y_{1K})$ is calculated by Formula (10), it is not limited to Formula (10), and the values of the filters may be changed in accordance with each signal $Y_{2K}/Y_{1K}$.

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

What is claimed is:

1. A sound enhancement apparatus, comprising:

a first directionality formation unit that is an electronic circuit configured to receive first input signals from a first microphone array, and perform beamforming (BF) on the received first input signals with respect to a first direction of a target area to thereby obtain a plurality of first BF outputs;

a second directionality formation unit that is an electronic circuit configured to receive second input signals from a second microphone array, and perform BF on the received second input signals with respect to a second direction of the target area to thereby obtain a plurality of second BF outputs;

a target area sound extraction unit that is an electronic circuit configured to process the first and second BF outputs to thereby correct a delay caused by a difference in distance between the target area and each of the first and second microphone arrays, and a power of a target area sound component in the first and second input signals, suppress a non-target area sound, and extract a target area sound;

an area sound enhancement filter formation unit that is an electronic circuit configured to estimate the target area sound component from the extracted target area sound, form an area sound enhancement filter for suppressing a component of the first input signals other than the estimated target area sound component, calculate a power ratio of the second BF outputs to the first BF outputs, and adjust the are sound enhancement filter base on the calculated power ratio; and an area sound emphasis unit that is an electronic circuit configured to apply the area sound enhancement filter, formed by the area sound enhancement filter formation unit, to the first input signals collected by the first microphone array.

2. The sound collection apparatus according to claim 1, wherein the area sound enhancement filter formation unit compares a threshold and the calculated power ratio after the formation of the area sound enhancement filter, and adjusts the area sound enhancement filter to suppress a component of the first input signals larger than the threshold.

3. The sound collection apparatus according to claim 1, further comprising a storage device configured to retain position information of all target areas, each of the first and second microphone arrays, and microphones constituting the first and second microphone arrays;

a delay correction unit that is an electronic circuit configured to calculate delay correction information for correct the delay using the retained position information; and a target area sound power correction coefficient calculation unit that is an electronic circuit configured to calculate a ratio of amplitude spectrums for each frequency in the first and second BF outputs, calculate a mode value or a median value of the ratio of amplitude spectrums between the first and second BF outputs, and set the calculated mode or median value to be a correction coefficient, wherein the target area sound extraction unit is configured to correct the the delay and the power of the target area sound component using the correction coefficient, extract the non-target area sound by performing a spectral subtraction, and extract the target area sound by spectrally subtracting the extracted non-target area sound from the first and second BF outputs.

4. A sound enhancement method, comprising:

receiving first input signals from a first microphone array;

performing beamforming (BF) on the received first input signals with respect to a first direction of a target area to thereby obtain a plurality of first BF outputs;

receiving second input signals from a second microphone array;

performing BF on the received second input signals with respect to a second direction of the target area to thereby obtain a plurality of second BF outputs;

processing the first and second BF outputs to thereby correct a delay caused by a difference in distance between the target area and each of the first and second microphone arrays, and a power of a target area sound component in the first and second input signals, suppress a non-target area sound, and extract a target area sound;

estimating the target area sound component from the extracted target area sound; forming an area sound enhancement filter for suppressing a component of the first input signals other than the estimated target area sound component;

calculating a power ratio of the second BF outputs to the first BF outputs, adjusting the area sound enhancement filter based on the calculated power ratio; and applying the area sound enhancement filter, formed by the area sound enhancement filter formation unit, to the first input signals collected by the first microphone array.

5. A sound enhancement apparatus, comprising:

a processor, and a non-transitory storage medium containing program instructions, execution of which by the processor causes the sound collection apparatus to provide functions of a first directionality formation unit configured to receive first input signals from a first microphone array, and perform beamforming (BF) on the received first input signals with respect to a first direction of a target area to thereby obtain a plurality of first BF outputs;

a second directionality formation unit configured to receive second input signals from a second microphone array, and perform BF on the received second input signals with respect to a second direction of the target area to thereby obtain a plurality of second BF outputs;

a target area sound extraction unit configured to process the first and second BF outputs to thereby correct a delay caused by a difference in distance between the target area and each of the first and second microphone arrays, and a power of a target area sound component in the first and second input signals, suppress a non-target area sound, and extract a target area sound;

an area sound enhancement filter formation unit configured to estimate the target area sound component from the extracted target area sound, form an area sound enhancement filter for suppressing a component of the first input signals other than the estimated target area sound component, calculate a power ratio of the second BF outputs to the first BF outputs, and adjust the area sound enhancement filter based on the calculated power ratio; and an area sound emphasis unit configured to apply the area sound enhancement filter, formed by the area sound enhancement filter formation unit, to the first input signals collected by the first microphone array.

* * * * *